US006968219B2

(12) United States Patent
Pattabiraman et al.

(10) Patent No.: US 6,968,219 B2
(45) Date of Patent: Nov. 22, 2005

(54) METHOD FOR REDUCING POWER CONSUMPTION IN BLUETOOTH AND CDMA MODES OF OPERATION

(75) Inventors: Ganesh Pattabiraman, Stanford, CA (US); John M. Burke, La Jolla, CA (US)

(73) Assignee: QUALCOMM, Incorporated, San Diego, CA (US)

( * ) Notice: Subject to any disclaimer, the term of this patent is extended or adjusted under 35 U.S.C. 154(b) by 399 days.

(21) Appl. No.: 09/930,759

(22) Filed: Aug. 15, 2001

(65) Prior Publication Data

US 2003/0036416 A1 Feb. 20, 2003

(51) Int. Cl.⁷ .......................... H04B 7/00; H04B 7/16; H04B 7/01; H04M 1/00; H04J 3/06
(52) U.S. Cl. .................... 455/574; 455/41.2; 455/41.3; 455/502; 455/343.2; 370/350; 370/503
(58) Field of Search .............................. 455/41.2, 502, 455/574, 343.2, 552.1, 553.1, 426.1, 41.3, 343.1, 343.4; 370/350, 503, 504, 491, 500, 515

(56) References Cited

U.S. PATENT DOCUMENTS 4,901,307 A 2/1990 Gilhousen et al.
5,103,459 A 4/1992 Gilhousen et al.
6,571,111 B1 * 5/2003 Mayo et al. ................ 455/574

FOREIGN PATENT DOCUMENTS

EP   1089578   4/2001
WO   0135578   5/2001

* cited by examiner

Primary Examiner—Lee Nguyen
Assistant Examiner—Yuwen Pan
(74) Attorney, Agent, or Firm—Philip R. Wadsworth; Thien T. Nguyen

(57) ABSTRACT

Method for reducing power consumption in Bluetooth and CDMA modes of operation is disclosed. According to a disclosed embodiment, the time for a next scheduled CDMA wakeup process to be performed by a CDMA module is established. Thereafter, if the next CDMA wakeup process is scheduled to be performed before the next Bluetooth wakeup process, a Bluetooth wakeup process is synchronized to be performed by a Bluetooth module at the same time as the next CDMA wakeup process. Following, when the time arrives for the CDMA module to perform the next CDMA wakeup process, the Bluetooth module also performs the Bluetooth wakeup process.

7 Claims, 3 Drawing Sheets

METHOD FOR REDUCING POWER CONSUMPTION IN BLUETOOTH AND CDMA MODES OF OPERATION

FIELD

The present invention relates generally to wireless communication devices and systems and more specifically to reducing power consumption in wireless communication devices.

BACKGROUND

Bluetooth is a wireless personal area network technology supporting wireless voice and data communication between different devices that are typically within ten meters of one another. A number of different devices can be Bluetooth-enabled, for example, cell phones, personal digital assistants or laptop computers. Each such device is equipped with Bluetooth components, including a receiver and transmitter, allowing it to communicate with other similarly equipped devices nearby without the use of cables or other physical connections.

As an example, a wireless code division multiple access (CDMA) cell phone can be Bluetooth-enabled, meaning that the cell phone would be able to communicate in both the CDMA network and the Bluetooth network. Such a Bluetooth-enabled CDMA cell phone would comprise both Bluetooth and CDMA components.

In Bluetooth-enabled devices, for example a Bluetooth-enabled CDMA cell phone ("phone"), the Bluetooth component assumes a standby mode when the device is not actively communicating with other Bluetooth-enabled devices, i.e. it is not participating in a Bluetooth network. While in standby mode, the Bluetooth component searches for other Bluetooth-enabled devices by periodically performing a wakeup process during which process it scans the surrounding environment for other Bluetooth-enabled devices. If the Bluetooth component encounters other Bluetooth-enabled devices during the scanning process and determines that a connection is needed, it can perform certain protocols in order to establish a short-range, wireless connection between the phone and such other devices. Otherwise, the scanning task is turned off until a next wakeup process. The standby cycle of waking-up, scanning and turning off repeats typically once, twice, or four times every 1.28 seconds for the duration of the standby period. However, it is appreciated that certain Bluetooth specifications may vary the timing and pattern of the cycle, for example requiring that the process be performed continuously for 1.28 seconds, or repeating the process sixteen times every 1.28 seconds. Further, certain Bluetooth specifications may require that the Bluetooth wakeup process be repeated, for example, at least once every 1.28 seconds, every 2.56 seconds, or any other interval which a particular specification may require.

While the phone's Bluetooth component scans for other Bluetooth-enabled devices as discussed above, the phone's CDMA component performs CDMA related tasks. Since CDMA requires precise time synchronization between the phone and the base station, one task the CDMA component has to perform is to synchronize with the base station. In order to synchronize with the base station while in idle mode, the CDMA component "wakes up" periodically during its allotted time slots to receive and process pilot signals from the base station on the CDMA Paging Channel. The CDMA component can synchronize with the base station by processing the pilot signals. For instance, the system time can be determined from the information embedded in the pilot signals.

How frequently the CDMA component wakes up is governed by the slot cycle index, which can be set by either the phone or the base station, as is known in the art. If the slot cycle index is zero, the CDMA component performs a wakeup process every 1.28 seconds, i.e. its allotted time slot comes around every 1.28 seconds. Alternatively, the slot cycle index can be set at, for example, one, in which case the wakeup process is performed every 2.56 seconds, or two, in which case the wakeup process is performed every 5.12 seconds. Thus, the lower the slot cycle index, the more frequently the wakeup process is repeated and the greater the power consumed.

Whether it is the Bluetooth component waking up and scanning for other Bluetooth-enabled devices and then shutting down, or the CDMA component waking up and synchronizing with the base station and then shutting down, power is consumed. Further, because each of the processes is performed repeatedly, the amount of power consumed can quickly drain the phone's power supply. Wasteful or excessive power consumption is of particular concern in wireless devices since it can hinder the device's operation and detract from its usefulness.

There is therefore a need in the art for a method and related system to reduce the amount of power consumed by various components of a Bluetooth enabled device, such as a Bluetooth-enabled CDMA cell phone.

SUMMARY

Embodiments disclosed herein address the above stated needs by synchronizing the time when a Bluetooth module performs a wakeup process to the time when a CDMA module performs a wakeup process in a Bluetooth-enabled device, such as a Bluetooth-enabled CDMA cell phone.

In one aspect of the invention, the time for the next scheduled CDMA wakeup process to be performed by the CDMA module is established. Once the time for the next scheduled CDMA wakeup process has been established, the next Bluetooth wakeup process can be synchronized to be performed by the Bluetooth module at the same time. In one aspect, the next Bluetooth wakeup process is only synchronized with the next CDMA wakeup process if the next CDMA wakeup process is scheduled to be performed before the next Bluetooth wakeup process is scheduled to be performed. As an example, the times for when the next CDMA wakeup process and the next Bluetooth wakeup process are to be performed can be established from the current CDMA time and current Bluetooth time, respectively. Thereafter, when the time arrives for the CDMA module to perform the next CDMA wakeup process, the Bluetooth module also performs a Bluetooth wakeup process. In this manner, the CDMA and Bluetooth wakeup processes can be performed substantially simultaneously, leading to a significant reduction in the power consumed by the Bluetooth-enabled device from performing each wakeup process separately.

In another aspect, a wireless mobile unit for synchronizing the next Bluetooth wakeup process with the next CDMA wakeup process can be assembled comprising a CDMA module configured to perform a CDMA wakeup process at a next scheduled time. The wireless mobile unit can further comprise a processor configured to synchronize the time of the next Bluetooth wakeup process to the time of the next CDMA wakeup process. Additionally, the wireless mobile unit can comprise a Bluetooth module configured to perform a Bluetooth wakeup process substantially simultaneously with when the CDMA module performs the next scheduled CDMA wakeup process.

DETAILED DESCRIPTION

The present invention is directed to a method for reducing power consumption in Bluetooth and CDMA modes of operation. Although the invention is described with respect to specific embodiments, the principles of the invention, as defined by the claims appended herein, can obviously be applied beyond the embodiments of the description described specifically herein. Moreover, certain details have been left out in order to not obscure the inventive aspects of the invention. The specific details not described in the present application are within the knowledge of a person of ordinary skill in the art.

The drawings in the present application and their accompanying detailed description are directed to merely example embodiments of the invention. To maintain brevity, other embodiments of the invention that use the principles of the present invention are not specifically described in the present application and are not specifically illustrated by the present drawings. The word "exemplary" is used exclusively herein to mean "serving as an example, instance, or illustration." Any embodiment described herein as "exemplary" is not necessarily to be construed as preferred or advantageous over other embodiments.

Figure 1:
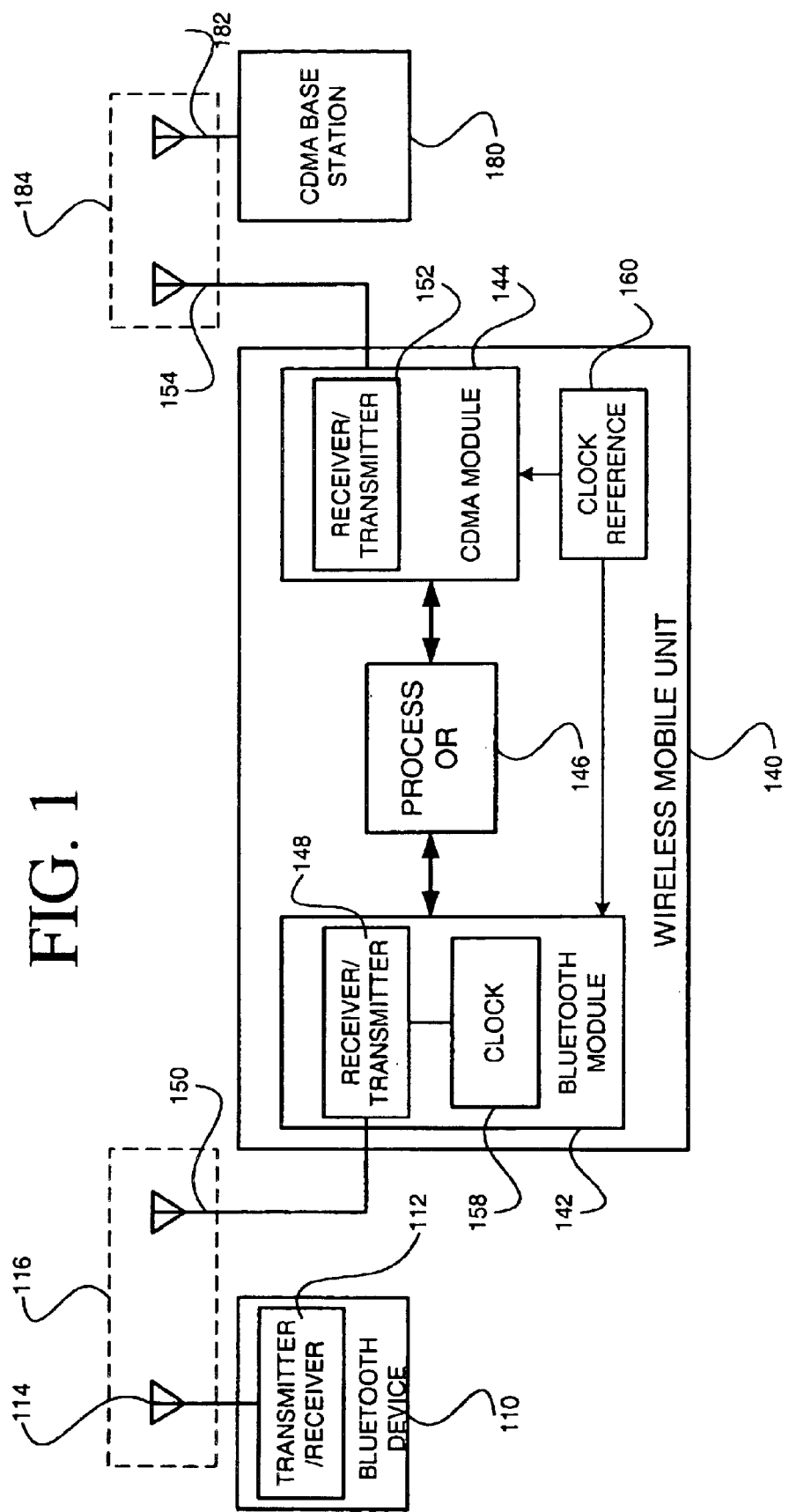
FIG. 1 is a block diagram of an exemplary wireless communication system in accordance with one embodiment of the invention.

FIG. 1 illustrates an exemplary wireless communication system in accordance with one embodiment of the invention. Exemplary wireless communication system 100 shown in FIG. 1 can comprise, for example, part of a code division multiple access ("CDMA") communication system. The general principles of CDMA communication systems, and in particular the general principles for generation of spread spectrum signals for transmission over a communication channel is described in U.S. Pat. No. 4,901,307 entitled "Spread Spectrum Multiple Access Communication System Using Satellite or Terrestrial Repeaters" and assigned to the assignee of the present invention. The disclosure in that patent, i.e. U.S. Pat. No. 4,901,307, is hereby fully incorporated by reference into the present application. Moreover, U.S. Pat. No. 5,103,459 entitled "System and Method for Generating Signal Waveforms in a CDMA Cellular Telephone System" and assigned to the assignee of the present invention, discloses principles related to PN spreading, Walsh covering, and techniques to generate CDMA spread spectrum communication signals. The disclosure in that patent, i.e. U.S. Pat. No. 5,103,459, is also hereby fully incorporated by reference into the present application. Further, the present invention utilizes time multiplexing of data and various principles related to "high data rate" communication systems, and the present invention can be used in "high data rate" communication systems, such as that disclosed in U.S. patent No. 6,574,211 entitled "Method and Apparatus for High Rate Packet Data Transmission" issued Jun. 3, 2003, and assigned to the assignee of the present invention. The disclosure in that patent is also hereby fully incorporated by reference into the present application.

As shown in FIG. 1, the invention's exemplary wireless communication system 100 comprises Bluetooth device 110, wireless mobile unit 140 and CDMA base station 180. Bluetooth device 110 can be any Bluetooth-enabled device, for example, a laptop computer equipped with Bluetooth components. Bluetooth device 110 is configured to communicate with other Bluetooth-enabled devices utilizing transmitter/receiver 112 and antenna 114.

Continuing with FIG. 1, wireless mobile unit 140 of wireless communication system 100 might be, for example, a Bluetooth-enabled CDMA cell phone in the present embodiment. As such, wireless mobile unit 140 comprises both Bluetooth and CDMA components, i.e. Bluetooth module 142 and CDMA module 144, respectively. According to the present invention, Bluetooth module 142 and CDMA module 144 share processor 146, which can be configured to monitor and direct the wakeup/sleep cycles of Bluetooth module 142 in standby mode and the wakeup/idle cycles of CDMA module 144 in idle mode. Further, as shown, wireless mobile unit 140 comprises clock reference 160, which can be configured to provide Bluetooth module 142 and CDMA module 144 with a common source of time.

As discussed above, when a Bluetooth-enabled device is not actively communicating in a Bluetooth network, the device's Bluetooth component assumes a standby mode from which it "wakes up" periodically in order to scan for other Bluetooth-enabled devices. Further, during the wakeup process, the Bluetooth component determines whether it is necessary to establish a connection with the Bluetooth-enabled devices it encounters. Scanning the surrounding environment for other Bluetooth-enabled devices is done in a manner known in the art and may involve, for example, the transmission, reception and processing of specific paging signals. It is noted that the process of waking up, scanning and then shutting down performed by Bluetooth module 142 is also referred to as a "Bluetooth wakeup process" in the present application.

Referring again to FIG. 1, Bluetooth module 142 has Bluetooth transmitter/receiver 148 which is connected to Bluetooth antenna 150. During standby mode, Bluetooth module 142 can utilize Bluetooth transmitter/receiver 148 and Bluetooth antenna 150 to scan the environment for other Bluetooth-enabled devices, e.g. Bluetooth device 110. In the present embodiment, Bluetooth module 142 is configured to perform a Bluetooth wakeup process twice every 1.28 seconds. However, those skilled in the art will appreciate that Bluetooth module 142 can be configured to perform a Bluetooth wakeup process at other intervals, for example every 1.28 seconds, every 0.32 seconds, or every 0.16 seconds. Further, it is appreciated that certain Bluetooth specifications may require that Bluetooth module 142 be configured to perform a Bluetooth wakeup process, for example, at least once every 1.28 seconds, every 2.56 seconds, or any other interval required by the particular Bluetooth specification. As shown in FIG. 1, Bluetooth device 110 and Bluetooth module 142 can communicate with each other via Bluetooth airlink 116 using their respective transmitter/receiver and antenna elements.

Bluetooth module 142 further comprises clock 158. In one embodiment, clock 158 is the internal clock for Bluetooth module 142. Clock 158 can be, for example, a 28-bit counter that tracks a current Bluetooth time and relays the current Bluetooth time to processor 146. It is noted that the current Bluetooth time is also referred to as "$BT_{current}$" in the present application.

Continuing with FIG. 1, CDMA module 144 of wireless mobile unit 140 comprises CDMA transmitter/receiver 152, which is connected to CDMA antenna 154. CDMA module 144 utilizes CDMA transmitter/receiver 152 and CDMA antenna 154 to communicate in a CDMA network, and more particularly with CDMA base station 180, via CDMA airlink 184. CDMA module 144 communicates with CDMA base station 180 by utilizing CDMA transmitter/receiver 152 and CDMA antenna 154 to transmit and receive signals. At the same time, CDMA base station 180 utilizes base station antenna 182 to receive signals from, and transmit signals to, CDMA module 144. Communication between CDMA module 144 and CDMA base station 180 is done in a manner known in the art.

When wireless mobile unit 140 is not actively communicating in the CDMA network, CDMA module 144 assumes an idle mode. CDMA module 144 engages in a number of tasks while it is in idle mode, including the task of synchronizing with CDMA system time. As is known in the art, the robustness of communication in a CDMA network depends in part on the time-synchronization of each component in the CDMA network, including mobile units, base stations, base station controllers, etc.

In order to synchronize with CDMA system time, CDMA module 144 utilizes transmitter/receiver 152 and CDMA antenna 154 to receive a pilot signal transmitted by CDMA base station 180. The received pilot signal is processed and the current CDMA system time determined from the data contained in the pilot signal. The processing of the pilot signal by CDMA module 144 and the determination of the current CDMA system time therefrom are done in a manner known in the art. In the present embodiment, the "current" time for CDMA module 144, which is also referred to as $CDMA_{current}$ in the present application, is set to the CDMA system time derived from the pilot signal. In one embodiment, clock reference 160 provides CDMA module 144 and Bluetooth module 142 with a common source of time such that the "current" time for both modules, i.e. $BT_{current}$ and $CDMA_{current}$, are the same. In another embodiment, clock reference 160 provides CDMA module 144 and Bluetooth module 142 with a common clock, but the absolute values of $BT_{current}$ and $CDMA_{current}$ may be different. Once $CDMA_{current}$ has been established, it is relayed to processor 146. It is noted that the process of waking up, synchronizing with base station 180 and shutting down performed by CDMA module 144 is also referred to as a "CDMA wakeup process" in the present application.

How frequently the CDMA component wakes up is governed by the slot cycle index ("SCI"), which can be set by either the phone or the base station in a manner known in the art. For example, if the SCI for CDMA module is zero, then CDMA module 144 performs a CDMA wakeup process every 1.28 seconds. Alternatively, the SCI can be set at, for example, one, in which case a CDMA wakeup process is performed every 2.56 seconds, or the SCI can be set at two, in which case the wakeup process is performed every 5.12 seconds. It is noted that the lower the SCI, the more frequently CDMA module 144 performs CDMA wakeup processes. In the present embodiment, the SCI is for CDMA module 144 is set at zero, i.e. CDMA module 144 is set to perform a CDMA wakeup process every 1.28 seconds.

Continuing with FIG. 1, processor 146 uses the information it receives from clock 158, i.e. $BT_{current}$, and from CDMA module 144, i.e. $CDMA_{current}$, in order to synchronize the wakeup schedule of Bluetooth module 142 with the wakeup schedule of CDMA module 144. In the present embodiment, in order to synchronize the two wakeup schedules, processor 146 has to determine how much time remains until the next wakeup process is scheduled for both Bluetooth module 142 and CDMA module 144. The respective times of the next scheduled wakeup process are hereinafter referred to as $BT_{next}$ for Bluetooth module 142, and as $CDMA_{next}$ for CDMA module 144.

Processor 146 can be configured to determine $BT_{next}$ and $CDMA_{next}$ based on how frequently Bluetooth wakeup processes and CDMA wakeup processes, respectively, are set to be performed. As stated above, Bluetooth module 142 can be set to perform a Bluetooth wakeup process at different intervals or frequency, e.g. once every 0.64 seconds, and CDMA module 144 can be set to perform a CDMA wakeup process every 1.28 seconds, every 2.56 seconds, or every 5.12 seconds, depending on its SCI. Thus, processor 146 can determine $BT_{next}$ by monitoring when Bluetooth module 142 last performed a Bluetooth wakeup process and then calculating when the next Bluetooth wakeup process is to be performed. Thus, as an illustration, if processor 146 determines that Bluetooth module 142 last performed a Bluetooth wakeup process at time T, and Bluetooth module 142 is set to perform a Bluetooth wakeup process every 0.64 seconds, then processor 146 can calculate $BT_{next}$ to be T plus 0.64 seconds. Similarly, if processor 146 determines that CDMA module 144 last performed a CDMA wakeup process at time Y, and CDMA module 144 is set to perform a CDMA wakeup process every 1.28 seconds, i.e. its SCI is set at zero, then processor 146 can calculate $CDMA_{next}$ to be Y plus 1.28 seconds.

Once the time for the next scheduled wakeup process has been established in the manner described above, the time remaining until that next scheduled wakeup process can be determined by calculating the time difference between the current time and the time of that next scheduled wakeup process. Accordingly, processor 146 can determine the time remaining until the next scheduled CDMA wakeup process as $CDMA_{next}$ less $CDMA_{current}$. In the present application, the time remaining until the next scheduled CDMA wakeup process is also referred to as $CDMA_{interval}$.

Continuing with FIG. 1, processor 146 synchronizes the wakeup schedule of Bluetooth module 142 to the wakeup schedule of CDMA module 144 by determining when the next Bluetooth wakeup process is to be performed in relation to when the next CDMA wakeup process is to be performed. If processor 146 determines that the next Bluetooth wakeup process is scheduled to be performed later than the next CDMA wakeup process, processor 146 will move the wakeup schedule of Bluetooth module 142 forward such that Bluetooth module 142 performs the next Bluetooth wakeup process at the same time CDMA module 144 performs the next CDMA wakeup process. In other words, processor 146 can trigger Bluetooth module 142 to perform its next Bluetooth wakeup process at $CDMA_{next}$, rather than waiting until $BT_{next}$. The next Bluetooth wakeup process would thus be synchronized with the next CDMA wakeup process. It is noted that the "new" or "synchronized" time for the next Bluetooth wakeup process is also referred to as $BT_{new}$ in the present application. The task of synchronizing the wakeup schedule of Bluetooth module 142 with the wakeup schedule of CDMA module 144 can be performed by software or in hardware in processor 146 of wireless mobile unit 140.

Synchronizing the two wakeup schedules reduces the power consumption of wireless mobile unit 140, because the power necessary to separately turn on Bluetooth module 142 and CDMA module 144 when they perform their respective wakeup processes can be shared when the two modules are turned on at the same time. Thus, FIG. 1 illustrates an exemplary wireless communication system wherein a wireless mobile unit configured to communicate in both a Bluetooth network and a CDMA network synchronizes the wakeup schedules of its Bluetooth module and its CDMA module in order to reduce the power consumption associated with unsynchronized wakeup schedules.

Figure 2:
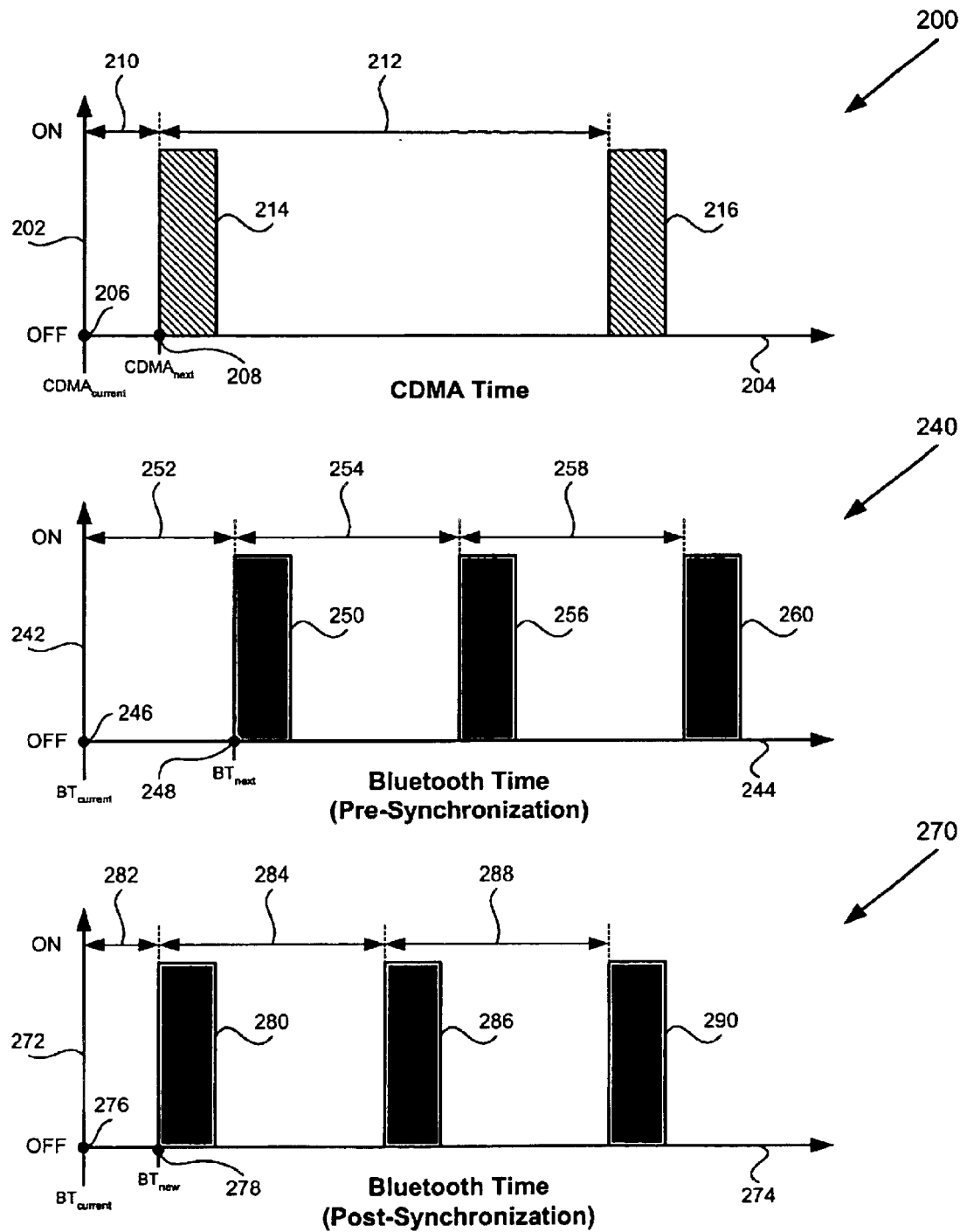
FIG. 2 shows three graphs illustrating the synchronization of wakeup schedules utilizing the system of FIG. 1.

Referring now to FIG. 2, graphs 200, 240 and 270 illustrate the result of synchronizing the wakeup schedule of a Bluetooth module to the wakeup schedule of a CDMA module in a wireless mobile unit such as, for example, wireless mobile unit 140 of FIG. 1, according to one embodiment. Thus, references will be made to wireless mobile unit 140 in order to facilitate discussion of graphs 200, 240 and 270.

Graph 200 illustrates a time sequence of the wakeup schedule for a CDMA module in a wireless mobile unit, e.g. CDMA module 144 in wireless mobile unit 140. In graph 200, axis 202 shows the on/off state of CDMA module 144, and axis 204 corresponds to time. The current CDMA system time, which can be derived from a pilot signal received from a base station as discussed above, is shown as $CDMA_{current}$ time 206. CDMA module 144 is in idle mode at $CDMA_{current}$ time 206 and not performing a CDMA wakeup process, i.e. CDMA module 144 is "off". However, at $CDMA_{next}$ time 208, CDMA module 244 turns on and begins CDMA wakeup process 214. The time interval between $CDMA_{current}$ time 206 and $CDMA_{next}$ time 208 is shown in graph 200 as interval 210. Thus, interval 210 represents the time period between the current CDMA time and the time when the next CDMA wakeup process is to be performed. Interval 212 represents the time between the start of CDMA wakeup process 214 and the start of CDMA wakeup process 216. Interval 212 can be, for example, 1.28 seconds, meaning that CDMA module 144 is set to perform a CDMA wakeup process every 1.28 seconds. In other words, CDMA module 144's SCI is set at zero.

Referring now to graph 240 of FIG. 2, a time sequence of a wakeup schedule for the wireless mobile unit's Bluetooth module, e.g. Bluetooth module 142 of wireless mobile unit 140, prior to synchronization to the CDMA module's wakeup schedule, is illustrated. In graph 240, axis 242 shows the on/off state of Bluetooth module 142, while axis 244 corresponds to time. It is seen that at $BT_{current}$ time 246, Bluetooth module 142 is "off" and not performing a Bluetooth wakeup process. However, at $BT_{next}$ time 248, Bluetooth module 142 turns on and begins Bluetooth wakeup process 250. The time interval between $BT_{current}$ time 246 and $BT_{next}$ time 248 is represented by interval 252. Thus, interval 252 is the length of time between current Bluetooth time and the time of the next scheduled Bluetooth wakeup process, i.e. Bluetooth wakeup process 250. Following an elapsed time equal to interval 254 subsequent to $BT_{next}$ time 248, Bluetooth module 142 performs Bluetooth wakeup process 256, and further, following another elapsed time equal to interval 258, Bluetooth module 142 performs Bluetooth wakeup process 260. In the present embodiment, Bluetooth module 142 can be set to perform a Bluetooth wakeup process every 0.64 seconds. Thus, each interval 252, 254, and 258 is equal to 0.64 seconds. Those skilled in the art, however, will appreciate that Bluetooth module 142 can be set to perform Bluetooth wakeup processes at other intervals or frequencies, for example, once every 1.28 seconds or once every 0.32 seconds.

In comparing graphs 200 and 240 in FIG. 2, it is seen that interval 252 is greater than interval 210. In other words, the length of time before the next Bluetooth wakeup process, i.e. Bluetooth wakeup process 250, is scheduled to be performed is greater than the length of time before the next CDMA wakeup process, i.e. CDMA wakeup process 214, is scheduled to be performed. This difference in time between when the next wakeup processes are scheduled to be performed can result in a significant drain on the power supply of wireless mobile unit 140, because Bluetooth module 142 and CDMA module 144 have to be turned on separately to perform their wakeup processes.

Referring now to graph 270, a post-synchronization time sequence for the wakeup schedule of Bluetooth module 142 is illustrated. In graph 270, axis 272 shows the on/off state of Bluetooth module 142, and axis 274 corresponds to time. Further, $BT_{current}$ time 276 in graph 270 is the same as $BT_{current}$ time 246 in graph 240, meaning that the "current" Bluetooth time is the same in both graphs. However, as shown in graph 270, the next scheduled Bluetooth wakeup process, i.e. Bluetooth wakeup process 280, has been "rescheduled" as a result of synchronization and is now set to be performed at $BT_{new}$ time 278. Thus, rather than having Bluetooth module 142 perform the next Bluetooth wakeup process at $BT_{next}$ time 248 as shown in graph 240, the outcome of synchronizing the wakeup schedule of Bluetooth module 142 to the wakeup schedule of CDMA module 144 is a temporal shift of the next Bluetooth wakeup process, such that the next Bluetooth wakeup process is performed at the same time as the next CDMA wakeup process. More particularly, synchronization results in the equalization of interval 282 in graph 270 and interval 210 in graph 200, leading to the concurrent performance of Bluetooth wakeup process 280 and CDMA wakeup process 214, at $BT_{new}$ time 278 and $CDMA_{next}$ time 208, respectively. This synchronization of Bluetooth wakeup process 280 with CDMA wakeup process 214 means that Bluetooth module 142 and CDMA module 144 can be powered on at the same time to perform their wakeup processes, resulting in a significant reduction in power consumption by wireless mobile unit 140.

Continuing with graph 270, Bluetooth wakeup process 286 follows Bluetooth wakeup process 280 after a length of time equal to interval 284 has elapsed, and Bluetooth wakeup process 290 follows after another elapsed time equal to interval 288. It is noted that Bluetooth wakeup processes 286 and 290 are equivalent to Bluetooth wakeup processes 256 and 260 in graph 240, shifted forward as a result of the synchronization of Bluetooth wakeup process 280 with CDMA wakeup process 214. Graphs 200, 240 and 270 in FIG. 2 thus illustrate the result of synchronizing the wakeup schedules of Bluetooth module 142 and CDMA module 144 in wireless mobile unit 140, resulting in a reduction in the amount of power consumed by wireless mobile unit 140.

Figure 3:
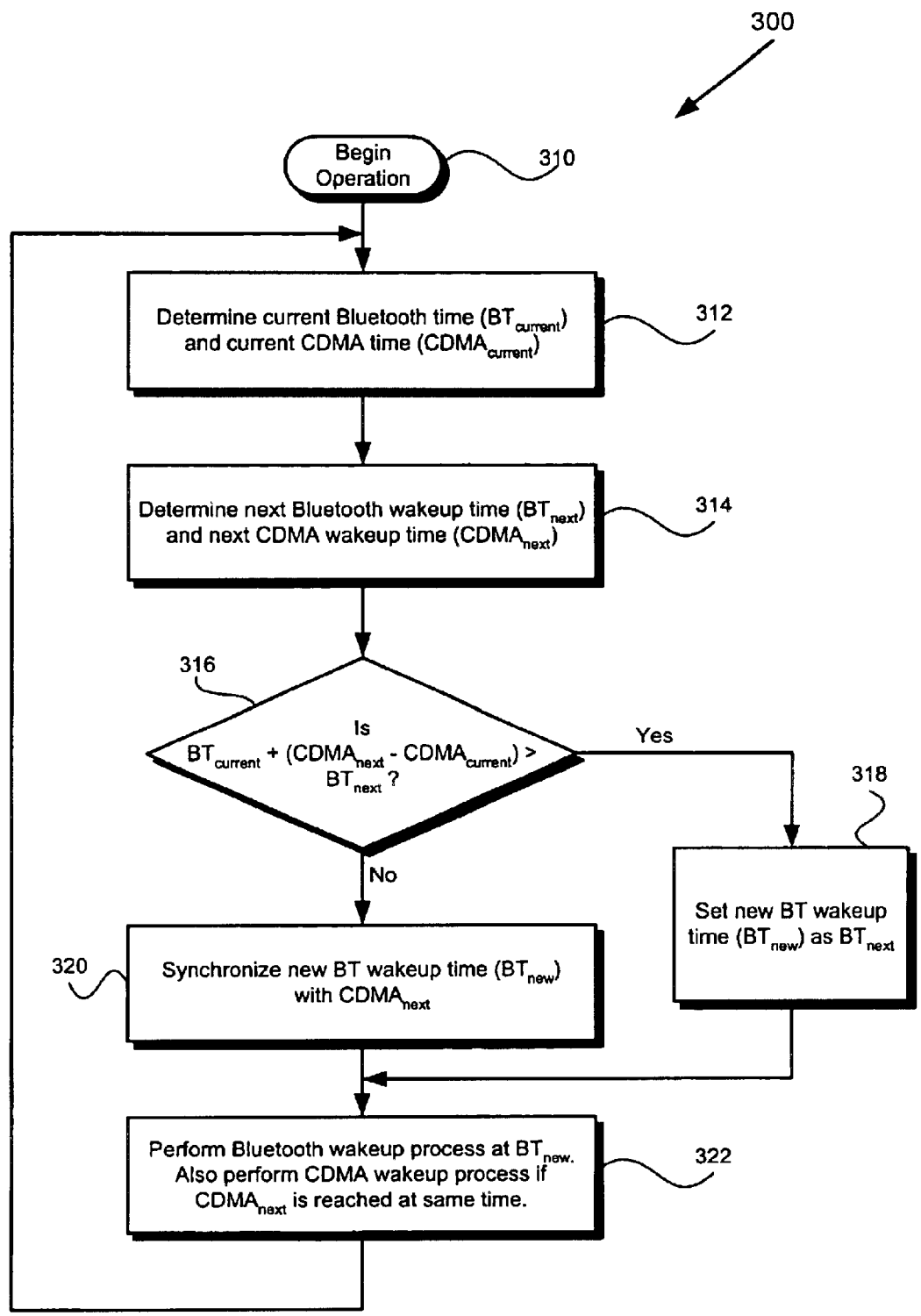
FIG. 3. is a flowchart of a process for synchronizing the wakeup schedules of a Bluetooth module and a CDMA module in a wireless mobile unit in accordance with one embodiment of the invention.

FIG. 3 shows flowchart 300 describing an exemplary process for synchronizing the wakeup schedules of a Bluetooth module and a CDMA module in a wireless mobile unit in accordance with one embodiment. More particularly, the process shown in flowchart 300 can be performed by a wireless mobile unit such as wireless mobile unit 140 in FIG. 1, which comprises both a Bluetooth component, i.e. Bluetooth module 142, and a CDMA component, i.e. CDMA module 144. Thus, for illustrative purposes, the process shown in flowchart 300 will be described in the context of wireless mobile unit 140 in FIG. 1.

Continuing with FIG. 3, the process for synchronizing the wakeup schedules of a Bluetooth module and a CDMA module in a wireless mobile unit begins at step 310 when, for example, wireless mobile unit 140 is not communicating in either a Bluetooth network or a CDMA network. In other words, the process begins when Bluetooth module 142 is in standby mode, and CDMA module 144 is idle. At step 312, the current Bluetooth time and the current CDMA time are determined. For example, current Bluetooth time, or $BT_{current}$, can be determined by an internal clock in Bluetooth module 142, which tracks the current Bluetooth time. Current CDMA time, or $CDMA_{current}$, can be determined, for instance, from the data in a pilot signal transmitted by a base station and received by CDMA module 144. In one embodiment, clock reference 160 provides CDMA module 144 and Bluetooth module 142 with a common source of time such that the "current" time for both modules, i.e. $BT_{current}$ and $CDMA_{current}$ are the same. Also at step 312, $BT_{current}$ and $CDMA_{current}$ are relayed to a processor such as processor 146 of wireless mobile unit 140 in FIG. 1 for further processing.

Continuing with flowchart 300 in FIG. 3, at step 314 of the process for synchronizing the wakeup schedules of a Bluetooth module and a CDMA module in a wireless mobile unit, the time for the next scheduled Bluetooth wakeup process and the time for the next scheduled CDMA wakeup process are determined. The time for the next scheduled Bluetooth wakeup process, or $BT_{next}$, is determined based on the time the preceding Bluetooth wakeup process was performed by Bluetooth module 142. $BT_{next}$ is also a function of how often Bluetooth wakeup processes are to be performed, for example, once every 1.28 seconds, every 0.64 seconds or every 0.32 seconds. In one embodiment, processor 146 monitors the time of the preceding Bluetooth wakeup process and calculates $BT_{next}$ by adding, for example, 1.28 seconds, 0.64 seconds or 0.32 seconds to the time of the last Bluetooth wakeup process, depending on how often Bluetooth wakeup processes are set to be performed. In a similar fashion, $CDMA_{next}$ can be calculated. In other words, processor 146 can monitor the time of the last CDMA wakeup process and then add, for example, 1.28, 2.56 seconds or 5.12 seconds to the time of the last CDMA wakeup process, depending on the SCI set for CDMA module 144, in order to calculate $CDMA_{next}$.

Continuing with flowchart 300, it is determined at step 316 whether $BT_{current}$ plus the interval between $CDMA_{next}$ and $CDMA_{current}$ is greater than $BT_{next}$. If $BT_{current}$ plus the interval between $CDMA_{next}$ and $CDMA_{current}$ is determined to be greater than $BT_{next}$, it indicates that the next CDMA wakeup process is scheduled to be performed by CDMA module 144 after the next Bluetooth wakeup process is scheduled to be performed by Bluetooth module 142. In such an instance, the process for synchronizing the wakeup schedules of a Bluetooth module and a CDMA module in a wireless mobile unit proceeds to step 318, where the time for the next Bluetooth wakeup process, also referred to as $BT_{new}$, is set as $BT_{next}$. The process then proceeds to step 322.

If at step 316 processor 146 determines instead that $BT_{current}$ plus the interval between $CDMA_{next}$ and $CDMA_{current}$ is not greater than $BT_{next}$, then the process proceeds to step 320. At step 320, the new time for the next Bluetooth wakeup process, or $BT_{new}$, is synchronized with $CDMA_{next}$, i.e. $BT_{new}$ is set as $CDMA_{next}$. In other words, if processor 146 determines at step 316 that the next CDMA wakeup process is scheduled to be performed before the next Bluetooth wakeup process, processor 146 "reschedules" the next Bluetooth wakeup process to be performed simultaneously with the next CDMA wakeup process by synchronizing $BT_{new}$ with $CDMA_{next}$.

The process for synchronizing the wakeup schedules of a Bluetooth module and a CDMA module in a wireless mobile unit then proceeds to step 322. At step 322, Bluetooth module 142 performs a Bluetooth wakeup process when $BT_{new}$ is reached. It is noted that, if processor 146 had determined at step 316 that the time difference between $CDMA_{next}$ and $CDMA_{current}$ is not greater than the time difference between $BT_{next}$ and $BT_{current}$, such that $BT_{new}$ is synchronized with $CDMA_{next}$ at step 320, CDMA module 144 would also perform a CDMA wakeup process at step 322. In this manner, i.e. Bluetooth module 142 and CDMA module 144 performing their wakeup process at the same time, the power consumption of wireless mobile unit 140 can be significantly reduced since the two modules can be powered up simultaneously.

Following step 322, the process for synchronizing the wakeup schedules of a Bluetooth module and a CDMA module in a wireless mobile unit returns to step 310. The process continues until, for example, Bluetooth module 142 exits standby mode or CDMA module 144 exits idle mode.

It is appreciated by those of skill in the art that the steps of flowchart 300 can be interchanged without departing from the scope of the present invention. Flowchart 300 in FIG. 3 thus illustrates an exemplary process for synchronizing the wakeup schedules of a Bluetooth module and a CDMA module in a wireless mobile unit, resulting in a reduction in power consumption by the wireless mobile unit, in accordance with one embodiment.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a wireless mobile unit. In the alternative, the processor and the storage medium may reside as discrete components in a wireless mobile unit.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method for synchronizing a wakeup schedule for a BLUETOOTH module and a wakeup schedule for a CDMA module in a wireless mobile unit, said method comprising:

determining a current CDMA time; and
   determining a current BLUETOOTH time
   determining a next CDMA wakeup time;
   determining a CDMA interval, said CDMA interval equaling said next CDMA wakeup time minus said current CDMA time;
   synchronizing a new BLUETOOTH wakeup time to said next CDMA wakeup time when said current BLUETOOTH time plus said CDMA interval is less than said next BLUETOOTH time.

2. A method for synchronizing a wakeup schedule for a BLUETOOTH module and a wakeup schedule for a CDMA module in a wireless mobile unit, said method comprising:

determining a current CDMA time and a current BLUETOOTH time;
   calculating a CDMA interval, said CDMA interval equaling a next CDMA wakeup time less said current CDMA time; and
   substantially synchronizing a new BLUETOOTH wakeup time to said next CDMA wakeup time when said current BLUETOOTH time plus said CDMA interval is less than a next BLUETOOTH time.

3. The method of claim 2 further comprising:
   establishing said next CDMA wakeup time prior to said step of calculating said CDMA time interval; and
   establishing said next BLUETOOTH wakeup time prior to said step of synchronizing said new BLUETOOTH time.

4. The method of claim 2 further comprising:
   performing a BLUETOOTH wakeup process and a CDMA wakeup process substantially at said new BLUETOOTH wakeup time.

5. The method of claim 4, wherein said performing comprises: powering on said BLUETOOTH module and said CDMA module substantially simultaneously so as to reduce said wireless mobile unit's power consumption.

6. The method of claim 2, wherein said wireless mobile unit comprises a BLUETOOTH-enabled CDMA cell phone.

7. A wireless mobile unit, comprising:
   a CDMA module comprising a CDMA transmitter/receiver and a CDMA antenna, said CDMA transmitter/receiver and said CDMA antenna being configured to receive a pilot signal, said CDMA module configured to:
      perform a CDMA wakeup process at a next CDMA wakeup time,
      derive a current CDMA time from said pilot signal;
   a BLUETOOTH module comprising a clock configured to track a current BLUETOOTH time, and
   a processor configured to:
      calculate a CDMA interval equaling said next CDMA wakeup time minus said current CDMA time,
      substantially synchronize a new BLUETOOTH wakeup time to a next CDMA wakeup time when said current BLUETOOTH time plus said CDMA interval is less than a next BLUETOOTH time.

* * * * *